US012521856B2

(12) United States Patent
Akiba

(10) Patent No.: US 12,521,856 B2
(45) Date of Patent: Jan. 13, 2026

(54) ELECTRIC DRIVING TOOL

(71) Applicant: MAKITA CORPORATION, Anjo (JP)

(72) Inventor: Yoshitaka Akiba, Anjo (JP)

(73) Assignee: MAKITA CORPORATION, Anjo (JP)

( * ) Notice: Subject to any disclaimer, the term of this patent is extended or adjusted under 35 U.S.C. 154(b) by 6 days.

(21) Appl. No.: 18/647,234

(22) Filed: Apr. 26, 2024

(65) Prior Publication Data

US 2025/0001571 A1 Jan. 2, 2025

(30) Foreign Application Priority Data

Jun. 29, 2023 (JP) ................................ 2023-107009
Jun. 29, 2023 (JP) ................................ 2023-107011

(51) Int. Cl.
*B25C 1/06* (2006.01)
*B25C 1/00* (2006.01)

(52) U.S. Cl.
CPC .............. *B25C 1/008* (2013.01); *B25C 1/003* (2013.01); *B25C 1/06* (2013.01)

(58) Field of Classification Search
CPC ........................................................ B25C 1/06
USPC ............................................................ 227/8
See application file for complete search history.

(56) References Cited

U.S. PATENT DOCUMENTS

| | | | | |
|---|---|---|---|---|
| 5,996,874 | A * | 12/1999 | Fukushima | B25B 21/023 227/138 |
| 8,011,441 | B2 * | 9/2011 | Leimbach | B25C 1/06 227/129 |
| 10,549,412 | B2 * | 2/2020 | McCardle | B25C 1/06 |
| 11,224,960 | B2 | 1/2022 | Garces et al. | |
| 12,179,325 | B2 * | 12/2024 | Neuhoff | B25C 1/008 |
| 2007/0272422 | A1 * | 11/2007 | Coleman | B25C 1/06 173/1 |
| 2018/0117748 | A1 * | 5/2018 | Ishikawa | B25C 1/046 |
| 2019/0099872 | A1 * | 4/2019 | Tanaka | B25C 1/184 |
| 2019/0366527 | A1 * | 12/2019 | Akiba | B25C 5/15 |
| 2020/0189080 | A1 * | 6/2020 | Aizawa | B25C 1/06 |
| 2024/0149416 | A1 * | 5/2024 | Sutherland | B25C 1/04 |
| 2024/0300081 | A1 * | 9/2024 | Baba | B25C 1/184 |
| 2025/0001571 | A1 * | 1/2025 | Akiba | B25C 1/003 |

FOREIGN PATENT DOCUMENTS

| | | | |
|---|---|---|---|
| JP | 6928457 | B2 | 9/2021 |

* cited by examiner

*Primary Examiner* — Praachi M Pathak
(74) *Attorney, Agent, or Firm* — Oliff PLC

(57) ABSTRACT

A driving tool has a nose portion in which a driving channel is formed. A contact arm is movably provided at an end of the nose portion. The contact arm moves between an OFF position and an ON position. A driver strikes a driven member set in the driving channel. A shutter moves between a blocked position located on a travel path of the driver, and an open position retracted from the travel path to allow the driver to move. A connecting rod connects the contact arm and the nose portion. The connecting rod allows the shutter to move from the open position to the blocked position in response to a movement of the contact arm from the ON position to the OFF position.

16 Claims, 14 Drawing Sheets

ELECTRIC DRIVING TOOL

CROSS-REFERENCE TO RELATED APPLICATIONS

This application claims priority to Japanese patent application serial numbers 2023-107009 and 2023-107011 both filed Jun. 29, 2023, the contents of which are incorporated herein by reference in their entirety for all purposes.

BACKGROUND

This disclosure relates to an electric driving tool configured to drive driven members such as nails and staples into woods and other materials.

Conventionally, an electric driving tool has a restricting member that is positioned between a driver and a driven member and blocks the driving motion of the driver. The restricting member is rotatably attached to a tool body around a pivot pin and is biased to a blocked position by a torsion spring. A contact arm is provided at an end of the driving tool. By pressing the contact arm against a workpiece, the contact arm moves from OFF position to ON position. In response to the movement of the contact arm, the restricting member moves from the blocked position to an open position, which permits the driver's driving operation. When the contact arm is released from the workpiece, the contact arm moves from the ON position to the OFF position by a spring. The restricting member moves from the open position to the blocked position by the torsion spring. However, if the torsion spring fails, there is a concern that the restricting member will not return from the open position to the blocked position.

Therefore, there has been a need for an electric driving tool with a structure that reliably moves the restricting member from the open position to the blocked position.

SUMMARY

According to one aspect of the present disclosure, an electric driving tool has a nose portion in which a driving channel is formed. A contact arm is movably provided at an end of the nose portion. The contact arm moves between an OFF position protruding from the nose portion and an ON position on the side of the nose portion from the OFF position. A driver strikes a driven member set in the driving channel. A restricting member moves between a blocked position located on a travel path of the driver and an open position retracted from the travel path to allow the driver to move. A connecting member connects the contact arm and the restricting member. The connecting member moves the restricting member from the blocked position to the open position in response to a movement of the contact arm from the OFF position to the ON position. The connecting member also moves the restricting member from the open position to the blocked position in response to the movement of the contact arm from the ON position to the OFF position.

Therefore, the movement of the contact arm in both directions is connected to the movement of the restricting member in both directions by the connecting member. Therefore, the restricting member moves reliably to the open or blocked position in response to the movement of the contact arm.

DETAILED DESCRIPTION

Figure 1:
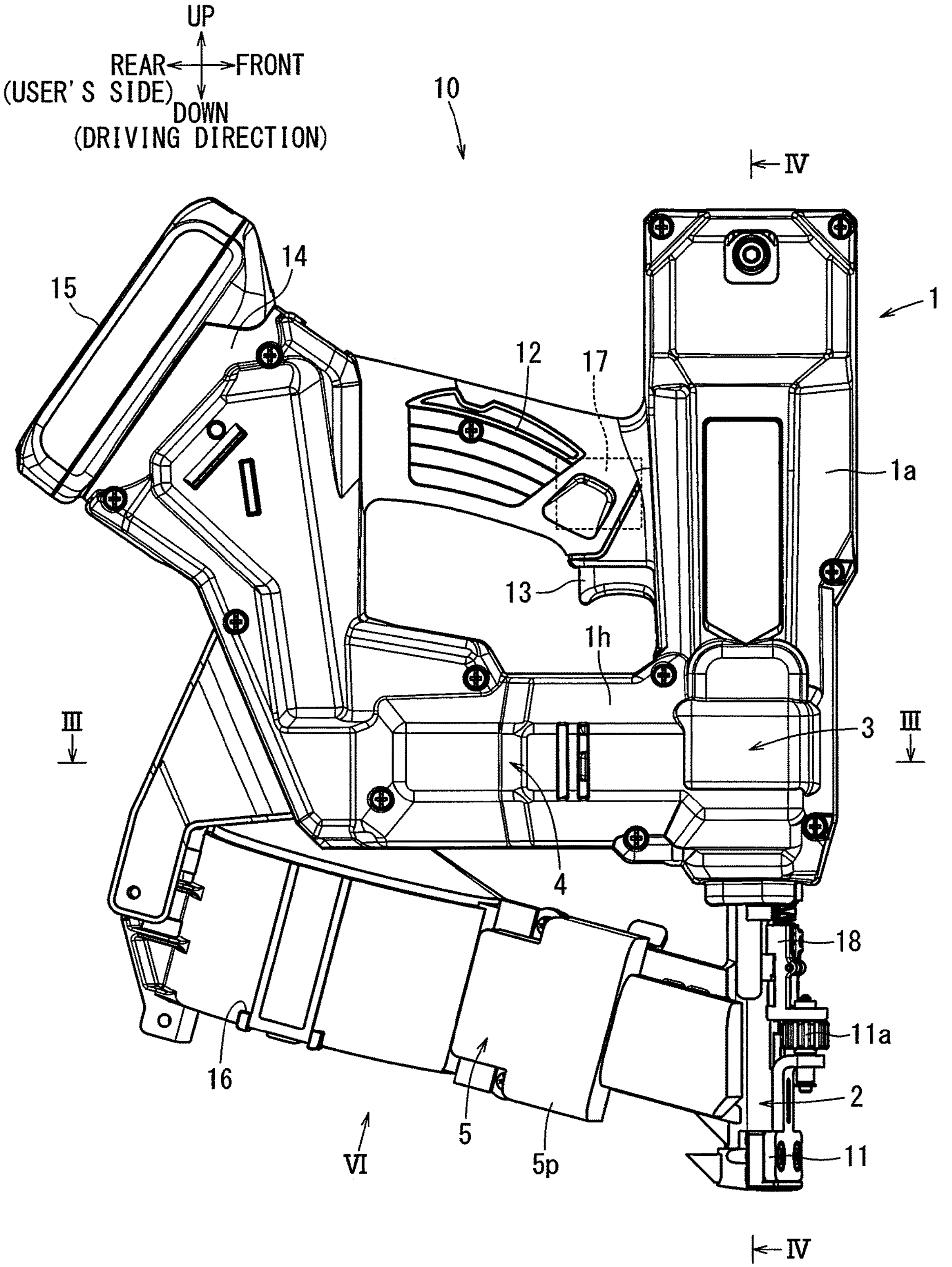
FIG. 1 is a right side view of an electric driving tool.

According to another aspect of the present disclosure, the connecting member has a first end rotatably connected to the contact arm and a second end rotatably connected to the restricting member. This enables smooth transmission of the movement of the contact arm to the restricting member via the connecting member.

According to another aspect of the present disclosure, the restricting member moves in a direction different from a direction of movement of the contact arm between ON and OFF positions. Thus, the restricting member can be moved in a preferred direction. For example, even if the movement direction of the contact arm is set to a driving direction in which the operation can be easily done while pressing the contact arm against a workpiece, the restricting member is likely to move in a direction different from the driving direction to block the driving channel.

According to another aspect of the present disclosure, the restricting member moves in a direction perpendicular to the driving direction of the driver. This may reduce an installation space for the restricting member in the driving direction. For example, the installation space for the restricting member in the driving direction may be reduced compared to a case where the restricting member moves in the driving direction. Furthermore, the restricting member may have a thickness along the driving direction to ensure the strength of the restricting member.

According to another aspect of the present disclosure, the nose portion has a guide hole perpendicular to the driving direction of the driver. The restricting member is inserted into the guide hole and slides along the guide hole. Therefore, the restricting member can be easily mounted to the nose portion via the guide hole. Furthermore, the guide hole may allow the restricting member to move smoothly.

According to another aspect of the present disclosure, the restricting member has a wide part formed wider than a width of the driver. When the driver moves in the driving direction and touches the restricting member, the wide part is supported by a downstream receiving surface of the guide hole in the driving direction. Therefore, the load of the driver can be distributed and transmitted to the downstream receiving surface of the guide hole. As a result, the impact of the driver can be supported by the restricting member and the downstream receiving surface of the guide hole.

According to another aspect of the present disclosure, when the driver moves in the driving direction and touches the restricting member, the restricting member is supported by a cooperation of upstream and downstream receiving surfaces of the guide hole in the driving direction. For example, when the restricting member is struck by the driver and tilted, the restricting member is supported between the upstream and downstream receiving surfaces in a clamped manner. Therefore, the impact of the driver can be supported by the restricting member as well as the upstream and downstream receiving surfaces of the guide hole.

According to another aspect of the present disclosure, the driver is located on a width center line of the restricting member as viewed from the driving direction of the driver. The connecting member is also located on the width center line of the restricting member. This allows the restricting member to support the driver without tilting to one side in the width direction when the driver touches the restricting member.

According to another aspect of the present disclosure, an electric driving tool has a nose portion in which a driving channel is formed. A contact arm is movably provided at an end of the nose portion. The contact arm moves between an OFF position protruding from the nose portion and an ON position on the side of the nose portion from the OFF position. The driver strikes a driven member set in the driving channel. A restricting member is movably provided at the nose portion in a direction perpendicular to the driving direction of the driver. The restricting member moves between a blocked position located on a travel path of the driver and an open position retracted from the travel path to allow the driver to move. Therefore, the restricting member moves in a direction perpendicular to the driving direction, thereby reducing the installation space for the restricting member in the driving direction.

According to another aspect of the present disclosure, the driven member may be a nail connected to a coiled connector. Thus, the driven member can be compactly contained and mounted.

Hereinafter, one example of the present disclosure will be described with reference to FIGS. 1 to 15. As shown in FIG. 1, the driving tool 10 is a gas spring type that uses, for example, gas pressure to drive driven member n. In the following description, the driving direction of the driven member n is defined as a downward direction and the counter-driving direction is defined as an upward direction. The user grasps the driving tool 10 with his/her hand and is positioned on a left side in FIG. 1. The user's front side is defined as a rearward direction (user's side) and a back side is defined as a frontward direction. Left-right direction is defined with reference to the user.

Figure 2:
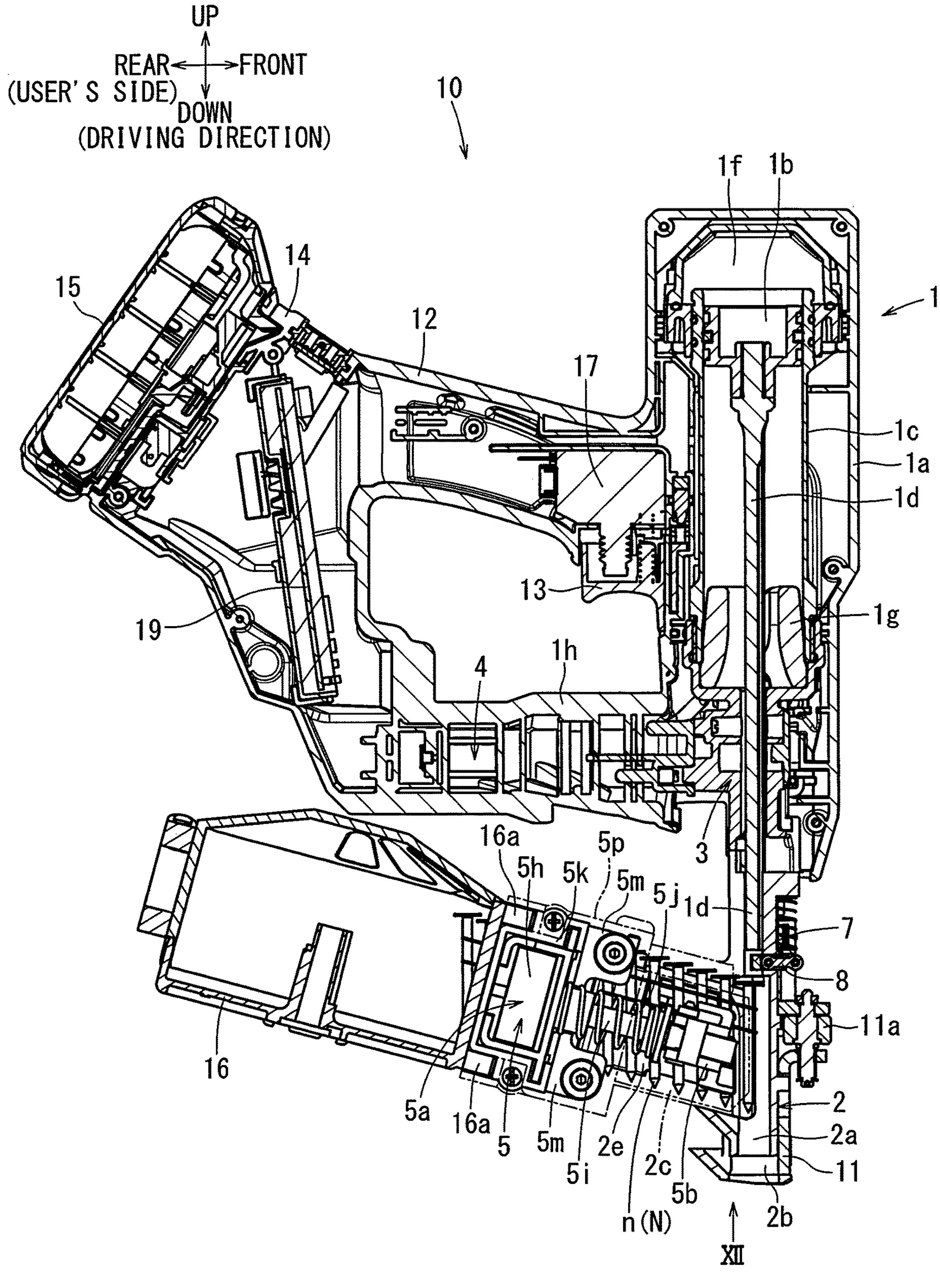
FIG. 2 is a schematic vertical sectional view of the driving tool.

As shown in FIG. 1 and FIG. 2, the driving tool 10 has a tool body 1. The tool body 1 is configured to have a cylinder 1*c* housed in a substantially cylindrical body housing 1*a*. The cylinder 1*c* houses a piston 1*b* that is reciprocally movable in an upward and downward direction. An upper portion of the cylinder 1*c* above the piston 1*b* is connected to a pressure accumulation chamber 1*f*. The pressure accumulation chamber 1*f* is filled with compressed gas, such as, for example, air. The gas pressure in the pressure accumulation chamber 1*f* acts as a thrust force to move the piston 1*b* downward (forward in the driving direction).

As shown in FIG. 1, a metal nose portion 2 is provided at a lower part of the tool body 1. As shown in FIG. 2, a driving channel 2*a* is formed inside the nose portion 2. An upper end of the driving channel 2*a* is connected to a lower part of the cylinder 1*c*. The nose portion 2 has a plate-like channel member 2*c* protruding obliquely upward toward the rear. The channel member 2*c* is made of a single member integral with the nose portion 2. The channel member 2*c* guides the movement of a connected driven member N. The connected driven member N includes a plurality of driven members n. The plurality of driven members n is provisionally joined in parallel by a flexible member such as a resin sheet material or wire. The connected driven member N is loaded into a magazine 16 in a coiled state. Each driven member N is fed one by one into the driving channel 2*a*, guided by the channel member 2*c* in an up/down extended posture. A lower part of the nose portion 2 is provided with a contact arm 11 that can slide upward and downward. The contact arm 11 is biased to the nose portion 2 so that it moves downward relative to the nose portion 2. As a result, the contact arm 11 is positioned in OFF position, protruding downward from the lower end of the nose portion 2. The contact arm 11 moves upward along the nose portion 2 by being pressed against the workpiece W. As a result, the contact arm 11 is positioned in ON position where its lower end may be substantially at the same height as the lower end of the nose portion 2.

As shown in FIG. 1, a grip 12 is provided at a rear part of the tool body 1 for the user to grasp. An actuator 13 is provided on a front bottom surface of the grip 12 that is operated by the user by pulling it with his/her fingertip. The pulling operation of the actuator 13 is allowed by moving the contact arm 11 upward relative to the nose portion 2. When the actuator 13 is pulled, the switch 17 is turned ON from OFF. When the switch 17 is turned ON, a signal is transmitted to a controller 19. The controller 19 operates the drive unit 4 described below based on the transmitted signal. A battery mounting portion 14 is provided at a rear part of the grip 12. A battery pack 15 can be removably mounted on a rear side of the battery mounting portion 14. The battery pack 15 is removably attached to the rear side of the battery mounting section 14. The battery pack 15 is removed from the battery mounting portion 14 and can be repeatedly charged with a separately provided charger. The battery pack 15 operates as a power source to supply power to the drive unit 4.

As shown in FIG. 2, a driver 1*d* elongated in the up/down direction is coupled to a lower side of the piston 1*b*. The lower part of the driver 1*d* enters the driving channel 2*a*. The driver 1*d* moves downward within the driving channel 2*a* due to the gas pressure in the pressure accumulation chamber 1*f* acting on the upper surface of the piston 1*b*. The lower end of the driver 1*d* strikes one driven member n fed into the driving channel 2*a*. The struck driven member n is ejected from an ejection port 2*b* of the nose portion 2. The ejected driven member n is driven into the workpiece W. At a lower part of the cylinder 1*c*, a damper 1*g* is arranged to absorb impact at downward motion end of the piston 1*b*. The damper 1*g* may be made of rubber material, for example. The damper 1*g* is cylindrical and the driver 1*d* passes through a center hole of the damper 1*g*. The lower side of the piston 1*b* contacts the upper side of the damper 1*g*.

Figure 7:
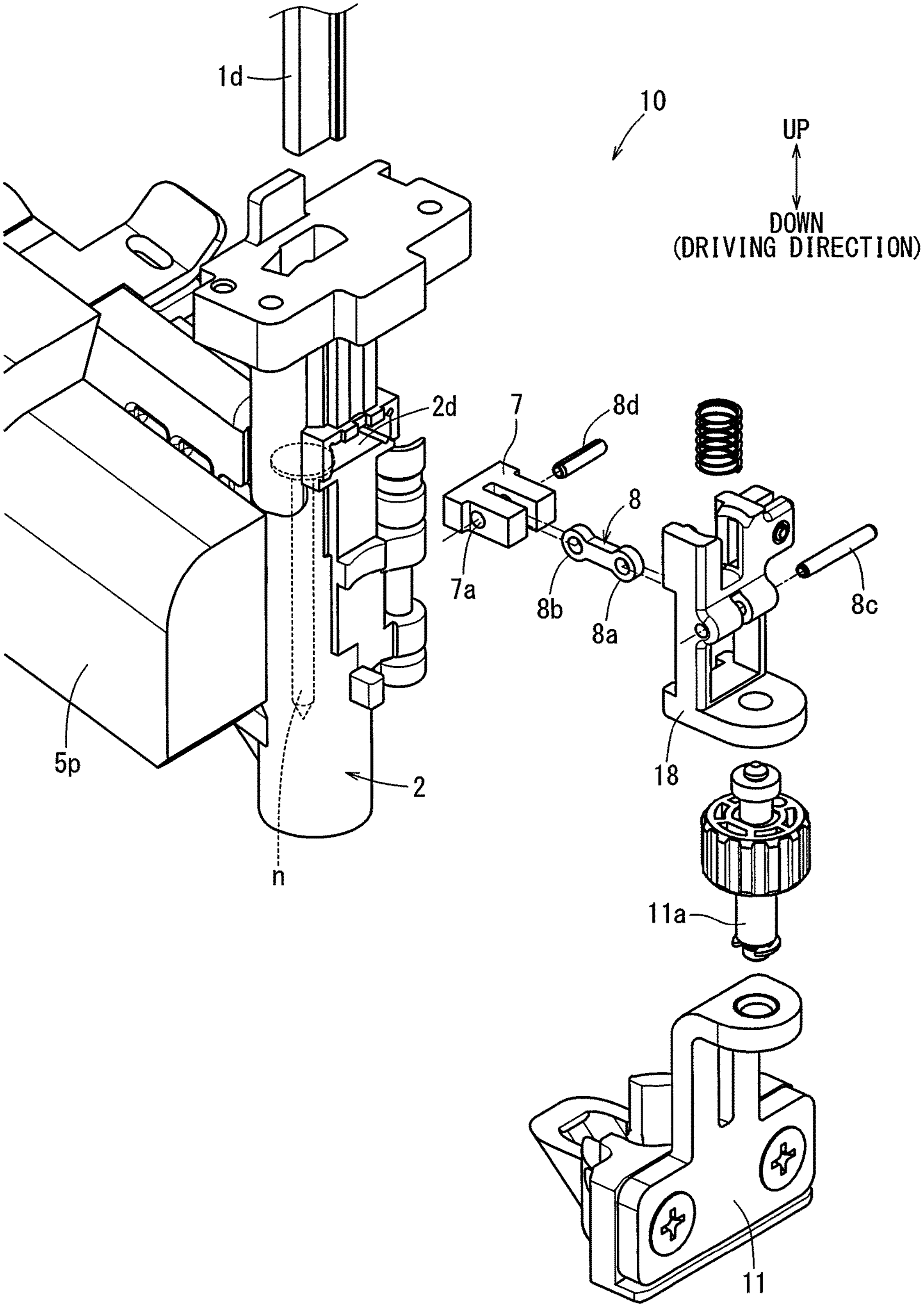
FIG. 7 is an exploded perspective view illustrating a connection structure between a contact arm and a shutter.
Figure 8:
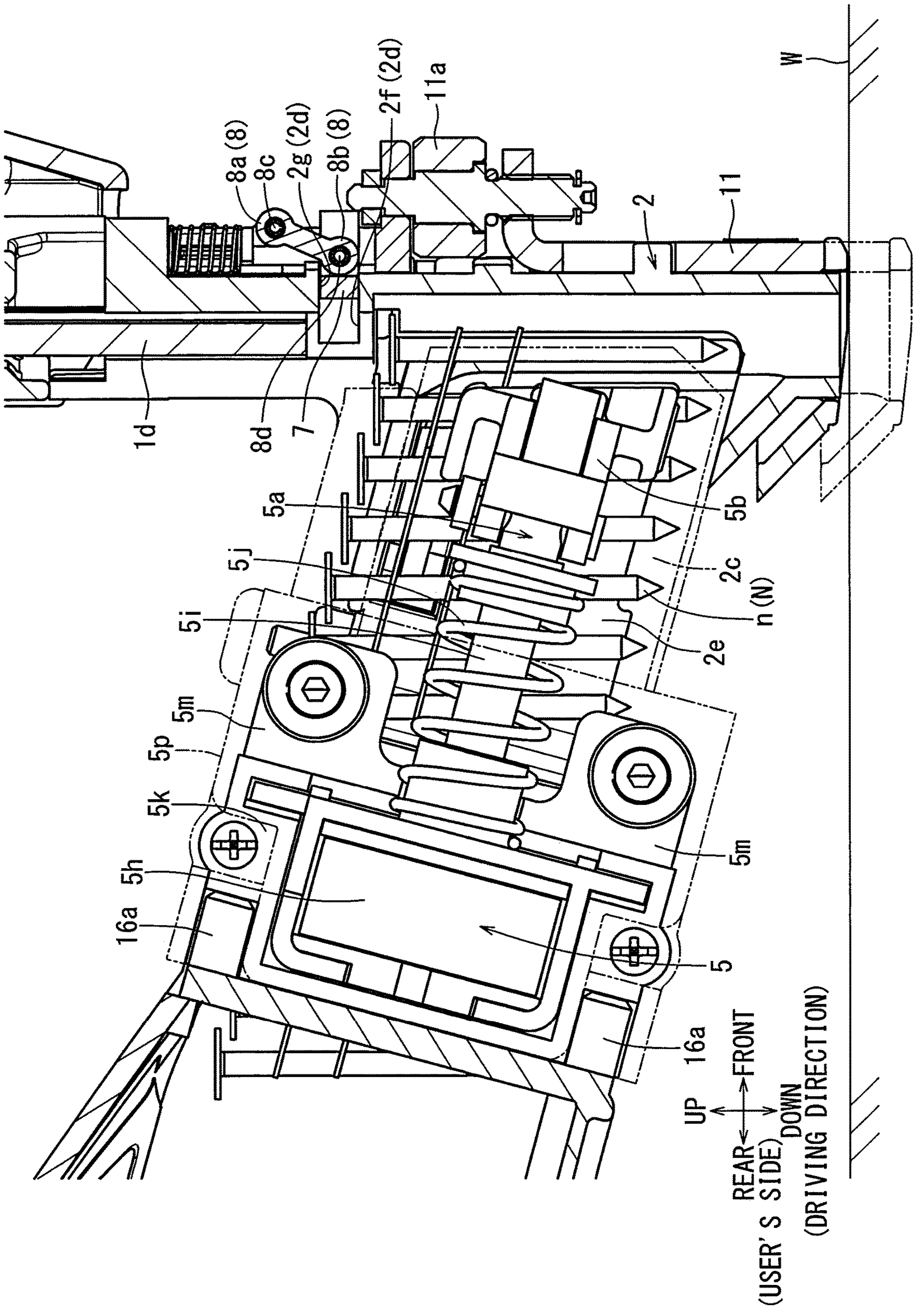
FIG. 8 is a vertical sectional view of a part of the driving tool with the contact arm moved to ON position.

As shown in FIG. 7, the nose portion 2 has a rectangular guide hole 2*d* that penetrates in the front-rear direction. A shutter (restricting member) 7 is slidably inserted along the guide hole 2*d* in the front-rear direction. The shutter 7 moves between a blocked position, located between the driver 1*d* and the driven member n set in the driving channel 2*a*, and an open position to open therebetween. As shown in FIG. 2, the shutter 7 in the blocked position blocks the movement of the driver 1*d*. As shown in FIG. 8, the shutter 7 in the open position allows the driver 1*d* to move. The shutter 7 slides in the front-rear direction, which is perpendicular to the driving direction of the driver 1*d*, to reduce the installation space in the driving direction. In addition, the thickness of the shutter 7 in the driving direction may enhance the strength of the shutter 7.

As shown in FIG. 7, the shutter 7 is rotatably connected to a rear part 8*b* of a connecting rod (connecting member) 8 via a rotary shaft 8*d*. A front part 8*a* of the connecting rod 8 is rotatably connected to a connecting bracket 18 via a rotary shaft 8*c*. The connecting bracket 18 is integrally coupled to the contact arm 11 via a connecting bolt 11*a*. This connection allows the shutter 7 to slide in the front-rear direction in conjunction with the up-down movement of the contact arm 11. As shown in FIG. 2, when the contact arm 11 is in the OFF position moving down with respect to the nose portion 2, the shutter 7 moves to the blocked position. As shown in FIG. 8, when the contact arm 11 is in the ON position moving up with respect to the nose portion 2, the shutter 7 moves to the open position. Therefore, even if the driver 1*d* moves downward while the contact arm 11 is in the OFF position due to a malfunction of the drive unit 4, etc., the shutter 7 can restrict the driving of the driven member n. Furthermore, if the contact arm 11 attempts to return to the OFF position before the driver 1*d* moves up after the driving of the driven member n is completed, the shutter 7 also attempts to return to the blocked position in conjunction with the contact arm 11. As a result, the shutter 7 stops upon contact with the driver 1*d*. The shutter 7 returns to the blocked position after the driver 1*d* is completed to move up. The shutter 7 is designed not to interfere the upward movement of the driver 1*d*.

Figure 14:
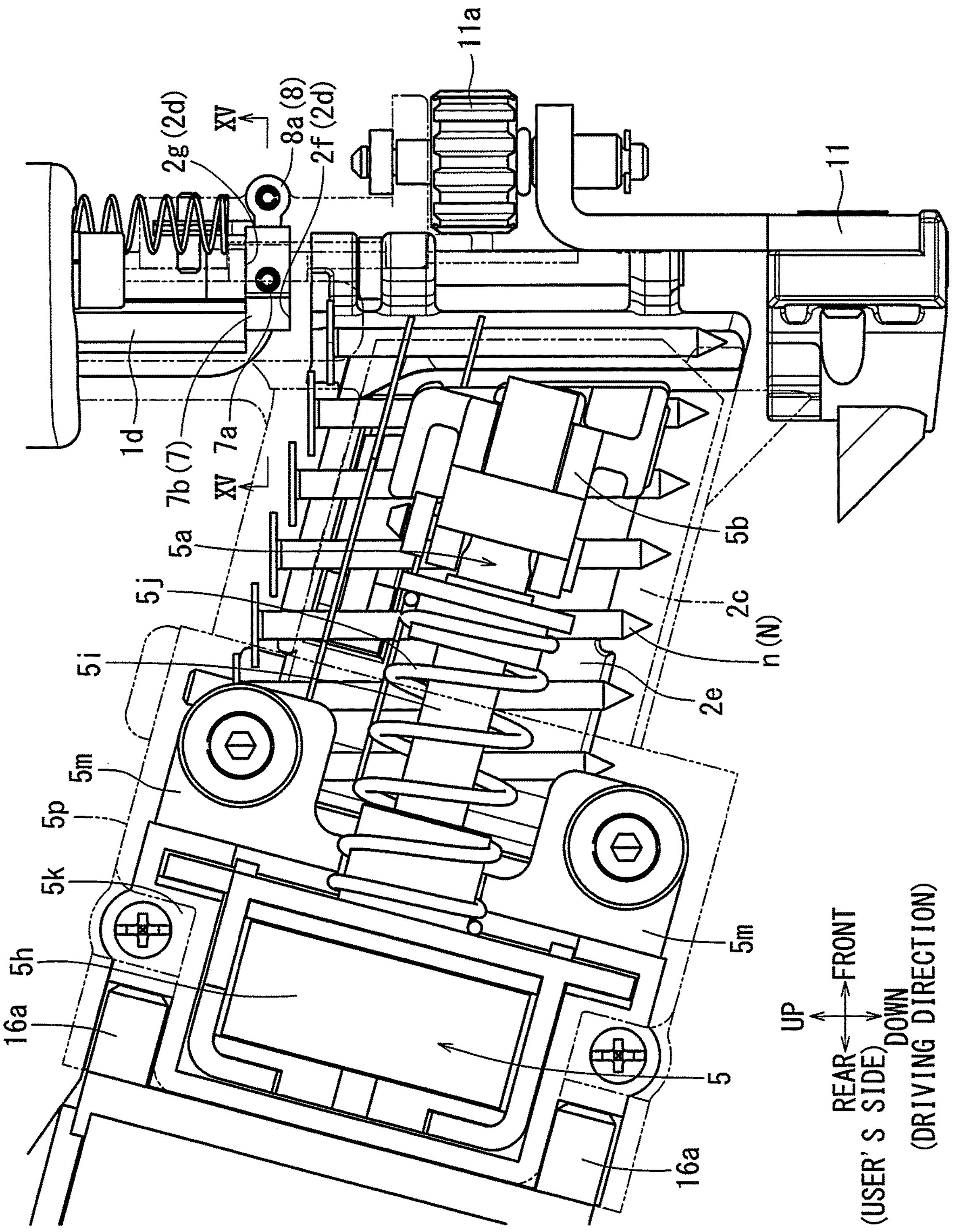
FIG. 14 is an enlarged view illustrating a state in which the shutter blocks the driver from striking.
Figure 15:
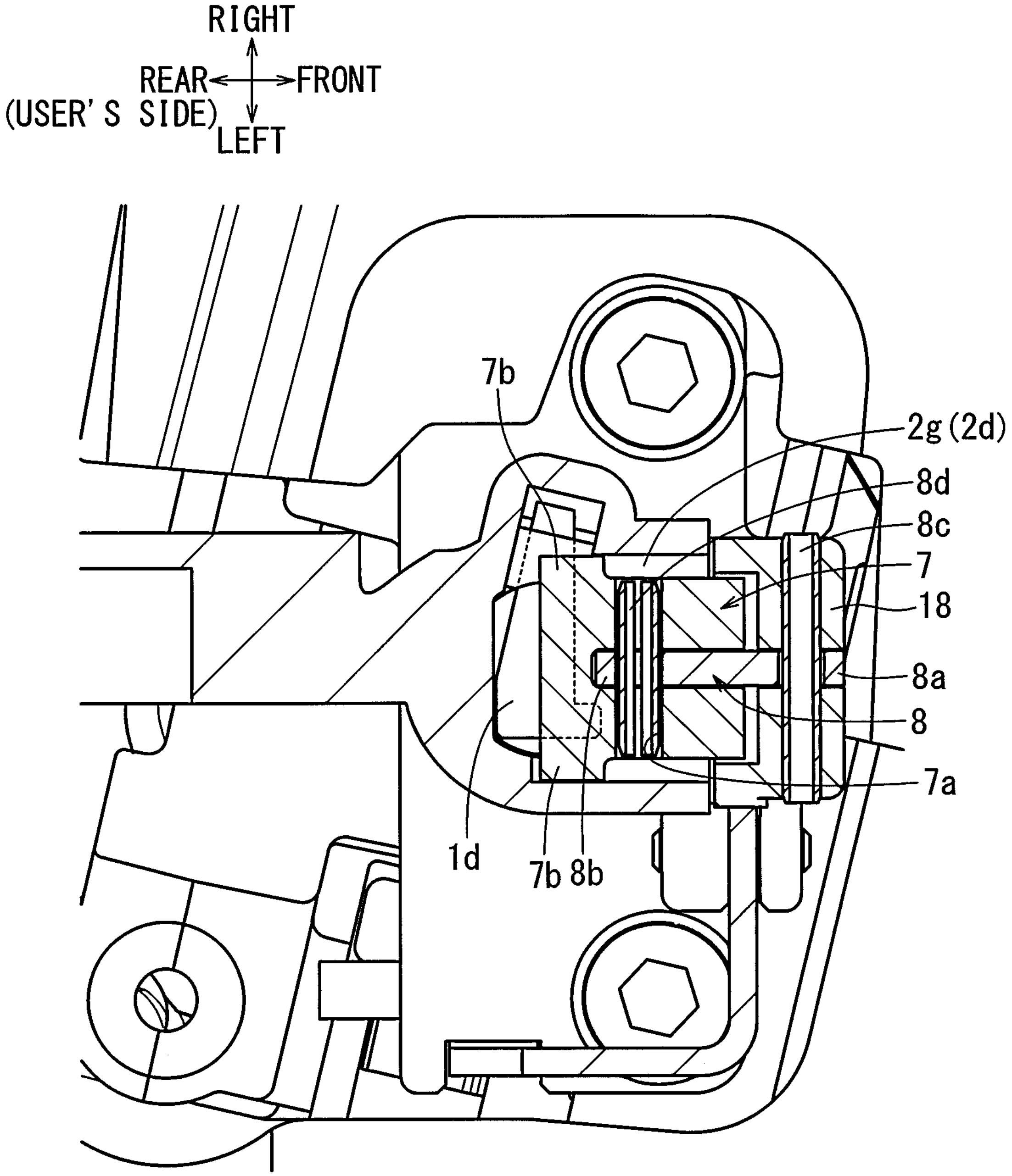
FIG. 15 is a cross sectional view taken along line XV-XV in FIG. 14.

FIG. 14 illustrates a condition in which the shutter 7 in the blocked position interrupts the movement of the driver 1*d*. The driver 1*d* stops when it collides with a rear part of the shutter 7. Therefore, the shutter 7 is subjected to an external force so that the rear part of the shutter 7 moves down while a front part of the shutter 7 moves up around the shaft hole 7*a*. The rear part of the shutter 7 is supported by the downstream receiving surface 2*f* of the guide hole 2*d*. The front part of the shutter 7 is supported by the upstream side receiving surface 2*g* of the guide hole 2*d*. Thus, the shutter 7 is supported between the upstream side receiving surface 2*g* and the downstream side receiving surface 2*f* of the guide hole 2*d* in a clamped manner. Thereby the shutter 7 may reliably support the impact of the driver 1*d*. As shown in FIG. 15, the rear part of the shutter 7 has a wide parts 7*b* that extend out on both left-right sides to be wider than the width of the driver 1*d* in the left-right direction. Each wide part 7*b* is also supported between the upstream receiving surface 2*g* and the downstream receiving surface 2*f* of the guide hole 2*d* in the clamped manner. A left-right direction width center line of the driver 1*d* coincides with the left-right direction width center line of the shutter 7. A left-right direction width center line of the connecting rod 8 also coincides with the left-right direction width center line of the shutter 7. Therefore, when the driver 1*d* hits the shutter 7, the shutter 7 can support the driver 1*d* without tilting to one side in the left-right direction.

Figure 4:
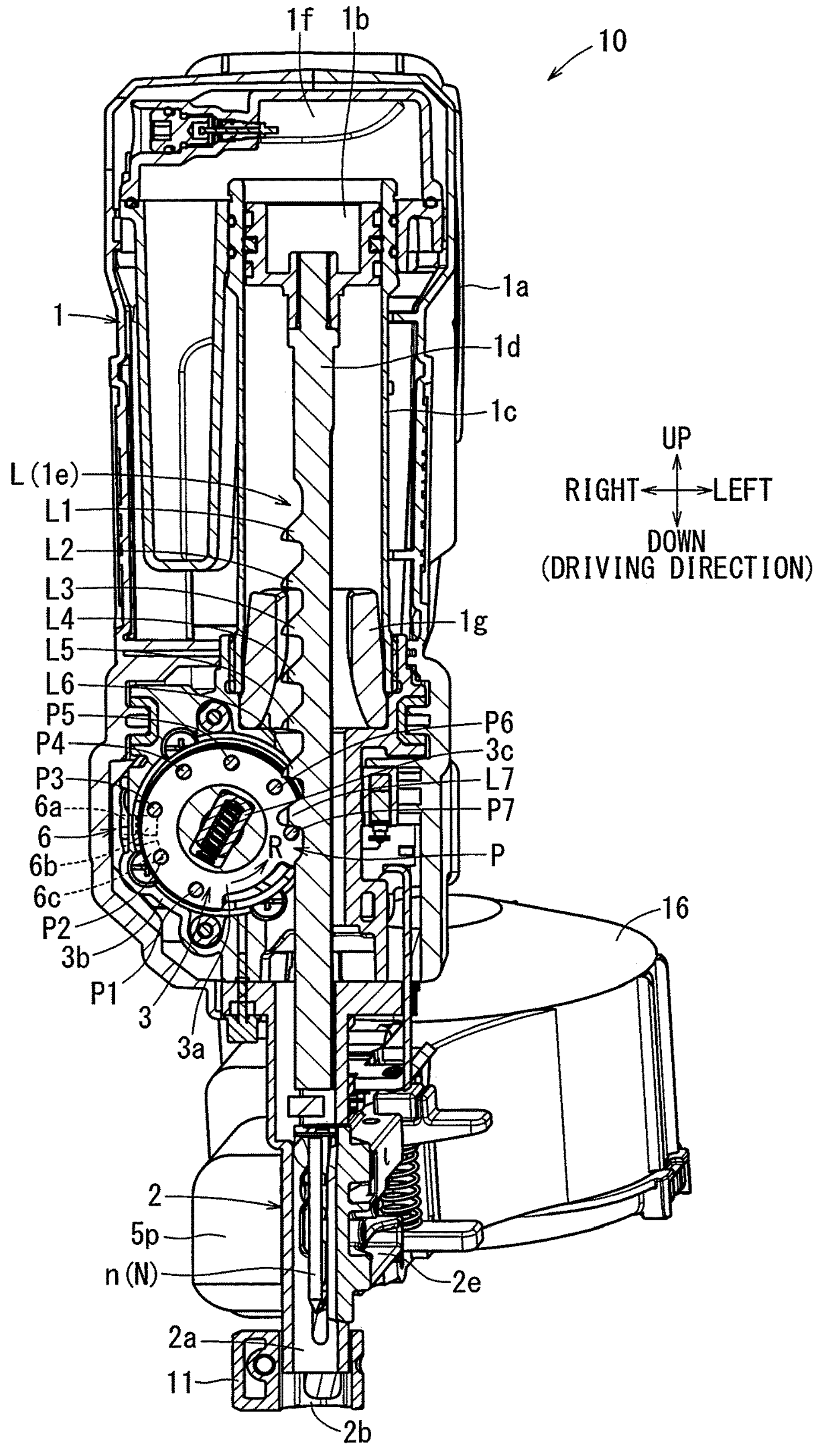
FIG. 4 is a sectional view taken along line IV-IV in FIG. 1.

As shown in FIG. 4, a rack 1*e* is provided on the right side of the driver 1*d*. The rack 1*e* has a plurality (e.g., seven) of convex engaging portions L projecting toward the wheel 3*a* side (right side). Each engaging portion L is arranged at regular intervals in the longitudinal (up-down) direction of the driver 1*d*. Hereafter, each engaging portion L is also referred to as a first engaging portion L1, a second engaging portion L2 . . . and a seventh engaging portion L7, in order from the top. Each engaging portion L engages lifter 3. The lifter 3 returns the driver 1*d* upward with the piston 1*b* after the driver 1*d* strikes. This causes the piston 1*b* to increase the gas pressure in the pressure accumulation chamber 1*f*. As shown in FIG. 2, a drive unit 4 is arranged in parallel on the rear part of the lifter 3 to operate the lifter 3. The lifter 3 and drive unit 4 are housed in a substantially cylindrical drive unit case 1*h*. The drive unit case 1*h* connects a lower part of the main body housing 1*a* and a lower part of the battery mounting portion 14 to each other. The drive unit case 1*h* is provided integrally with the main body housing 1*a*.

Figure 3:
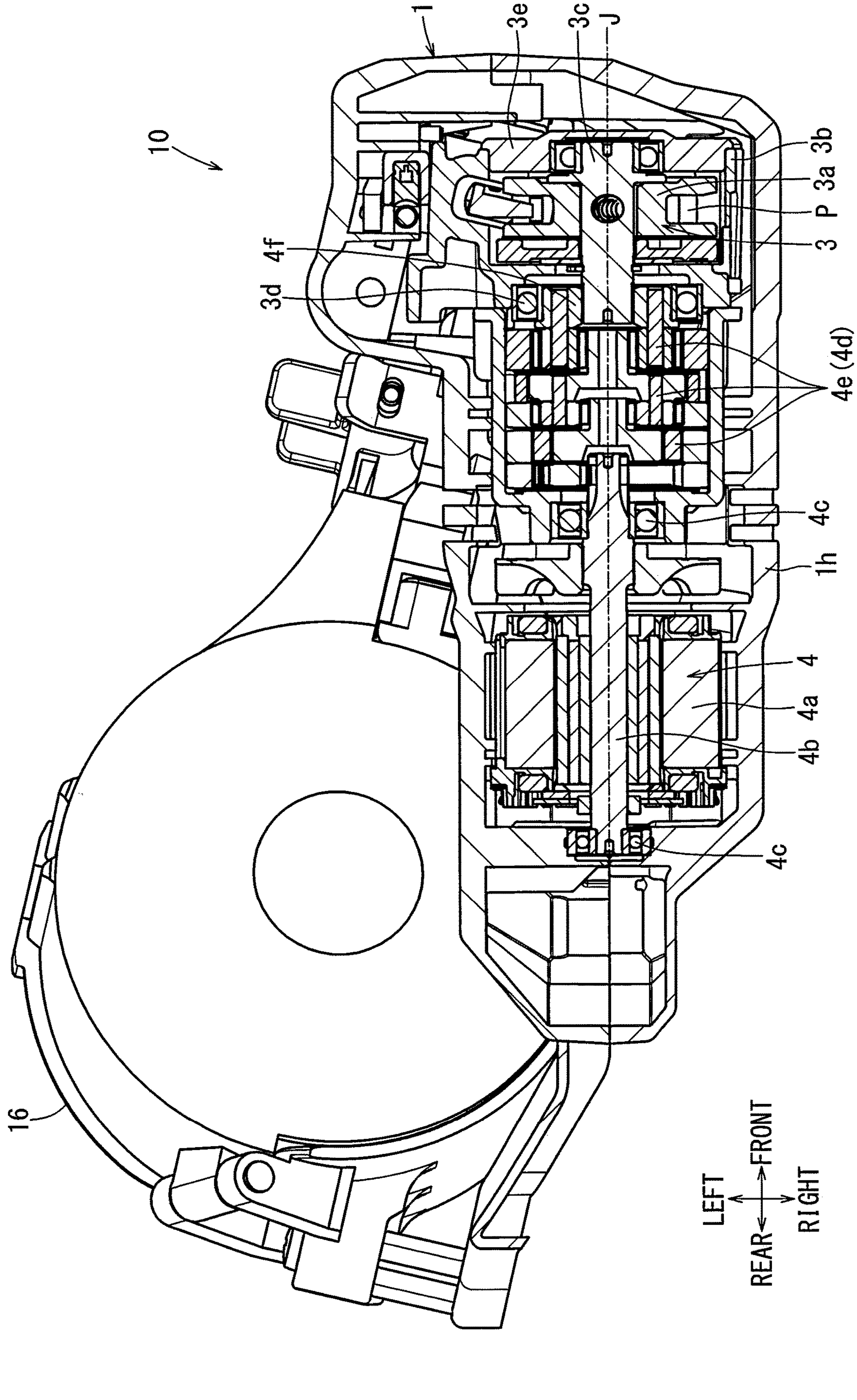
FIG. 3 is a sectional view taken along line III-III in FIG. 1.

As shown in FIG. 3, the drive unit 4 has a motor 4*a* as a drive source. The motor 4*a* is housed in a position with the axis of the output shaft 4*b* (motor axis J) aligned in a front-rear direction perpendicular to the driving direction (perpendicular to the sheet surface in FIG. 3). The output shaft 4*b* is rotatably supported by the drive unit case 1*h* via a bearing 4*c*. A gear formed at a front part of the output shaft 4*b* is connected to the reduction gear 4*d*. Three planetary gear trains 4*e* are used in the reduction gear 4*d*. Each planetary gear train 4*e* is coaxial with each other and with the motor axis J. The rotational output of the motor 4*a* is decelerated in the reduction section 4*d* and output to the lifter 3.

As shown in FIG. 3, the lifter 3 has a rotary shaft 3*c* connected to the reduction gear 4*d* and a wheel 3*a* supported on the rotary shaft 3*c*. The lifter 3 is housed in the substantially cylindrical mechanism case 3*b*, which is housed in the drive unit case 1*h*. The axis of the rotary shaft 3*c* is coaxial with the motor axis J. A front part of the mechanism case 3*b* is sealed by a lid 3*e*. A front end of the rotary shaft 3*c* is rotatably supported to a bearing 3*d* held in the mechanism case 3*b* via the lid 3*e*. A rear end of rotary shaft 3*c* is coupled to a carrier 4*f* of reduction gear 4*d*. The carrier 4*f* of the reduction gear 4*d* is rotatably supported to the mechanism case 3*b* via the bearing 3*d* provided on an outer peripheral side.

Figure 5:
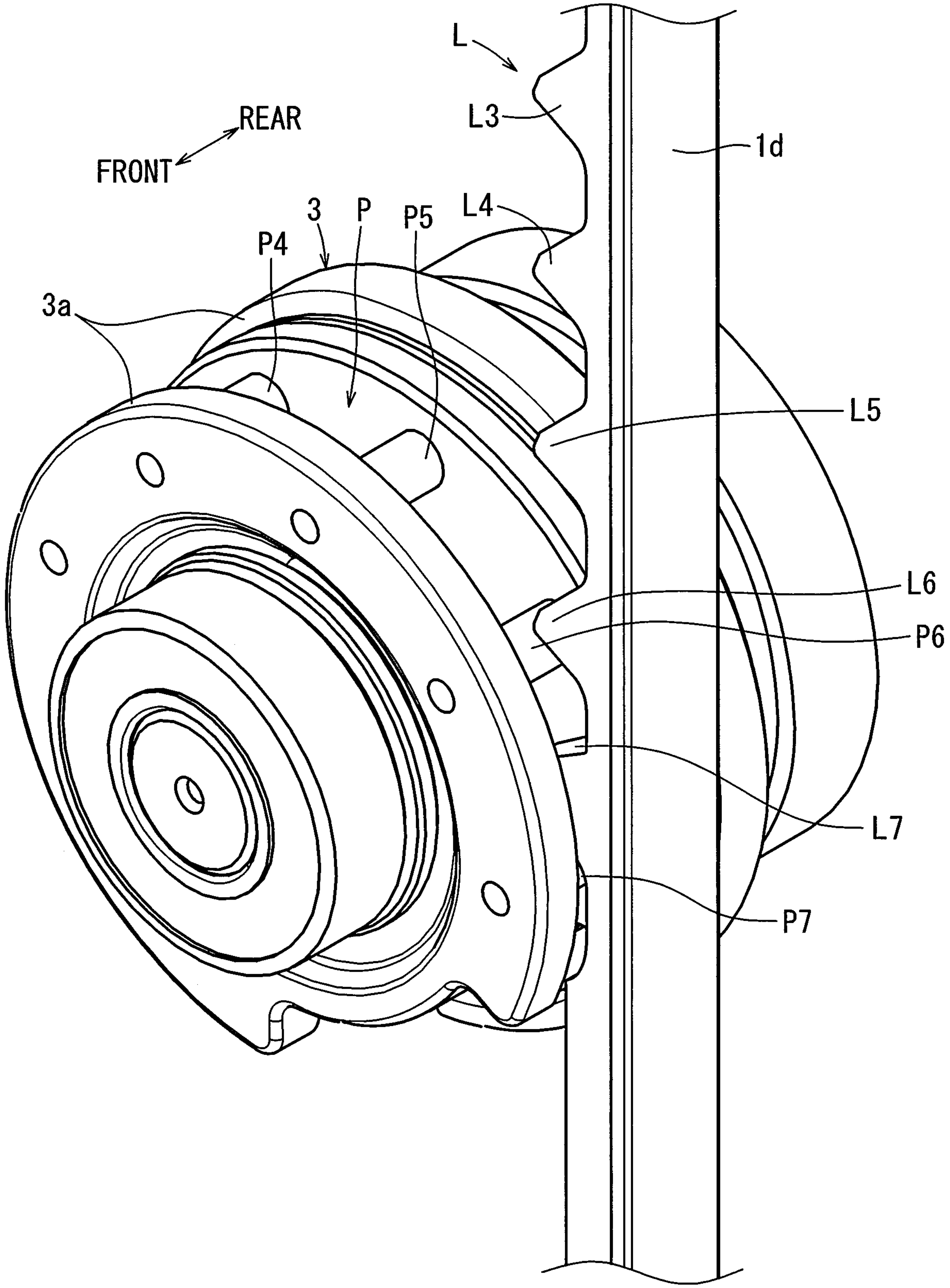
FIG. 5 is a perspective view of a part of a lifter and a driver.

As shown in FIG. 4, when motor 4*a* starts, the rotary shaft 3*c* and the wheel 3*a* rotate together in a direction indicated by an arrow R (counterclockwise in FIG. 4). The wheel 3*a* is configured to rotate only in the direction indicated by the arrow R. As shown in FIG. 5, the lifter 3 has two opposing wheels 3*a*. A plurality of engagement pins P is arranged between the wheels 3*a*. As shown in FIG. 4, the plurality of engagement pins P is arranged at regular intervals along the outer circumference of the wheels 3*a*. The engagement pins Pare also referred to as a first engagement pin P1, a second engagement pin P2 . . . and a seventh engagement pin P7, in order from a leading side in the direction of rotation of the wheel 3*a*.

As shown in FIG. 4, the lifter 3 is provided with a position detection sensor 6 that detects a position of the lifter 3. The position detection sensor 6 has two magnets 6*b* and 6*c* and a Hall IC 6*a* that detects magnetism of each magnet 6*b* and 6*c*. Each magnet 6*b* and 6*c* is provided on an outer circumference of the wheel 3*a* along a direction of rotation of the wheel 3*a*. The Hall IC 6*a* is provided in the mechanism case 3*b*. When the Hall IC 6*a* detects the magnetism of each magnet 6*b* and 6*c*, it transmits a signal to a controller 19. This allows the controller 19 to determine the rotational position of the wheel 3*a*.

FIG. 4 shows the driver 1*d* returned upward by the lifter 3 and set in a stand-by position. The driven member N, which is at a lead of the connecting driven member N, is set in the driving channel 2*a*. A seventh engagement pin (final engagement pin) P7 of the lifter 3 is engaged with a seventh engaging portion (final engaging portion) L7 of the rack 1*e*. As a result, the driver 1*d* is held in the stand-by position against the gas pressure in the pressure accumulation chamber 1*f*. At this time, the first magnet 6*b* is positioned opposite to the Hall IC 6*a*. The controller 19 thereby determines that the driver 1*d* is in the stand-by position.

As shown in FIG. 8, when using the driving tool 10, the user first grasps the grip 12 (see FIG. 1) and presses the contact arm 11 against the workpiece W. This causes the contact arm 11 to move upward relative to the nose portion 2. A restricting structure for mechanically restricting the pulling operation of the actuator 13 allows the pulling operation of the actuator 13 in conjunction with the upward movement of the nose portion 2. The shutter 7 slides into the open position that allows the driver 1*d* to strike in conjunction with the contact arm 11. When the user pulls the actuator 13 as shown in FIG. 2, the switch 17 turns from OFF to ON, and the controller 19 operates the drive 4. This causes wheel 3*a* to rotate in the direction indicated by the arrow R, as shown in FIG. 4.

Figure 9:
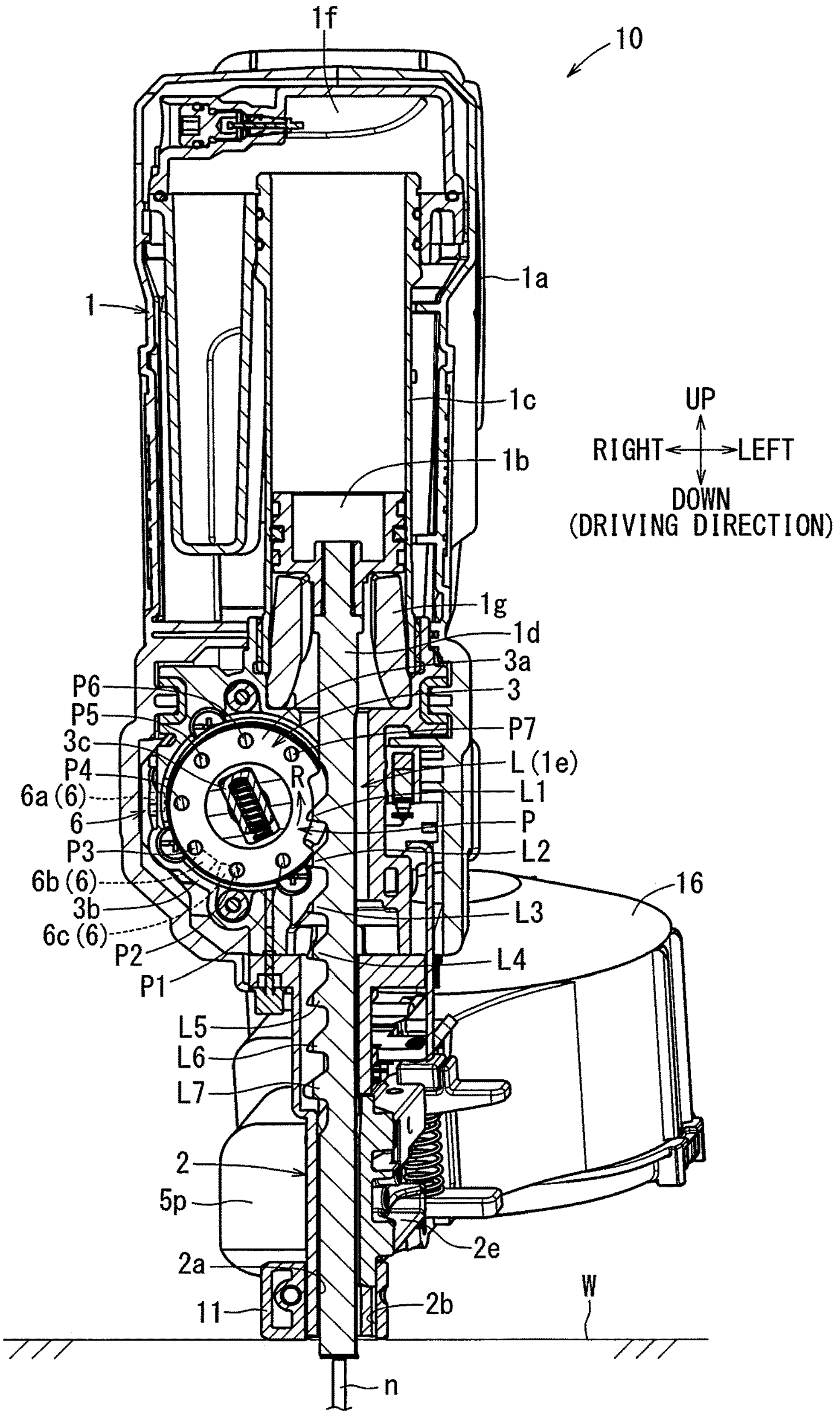
FIG. 9 is a view corresponding to FIG. 4 when the driver impacts a driven member.
Figure 10:
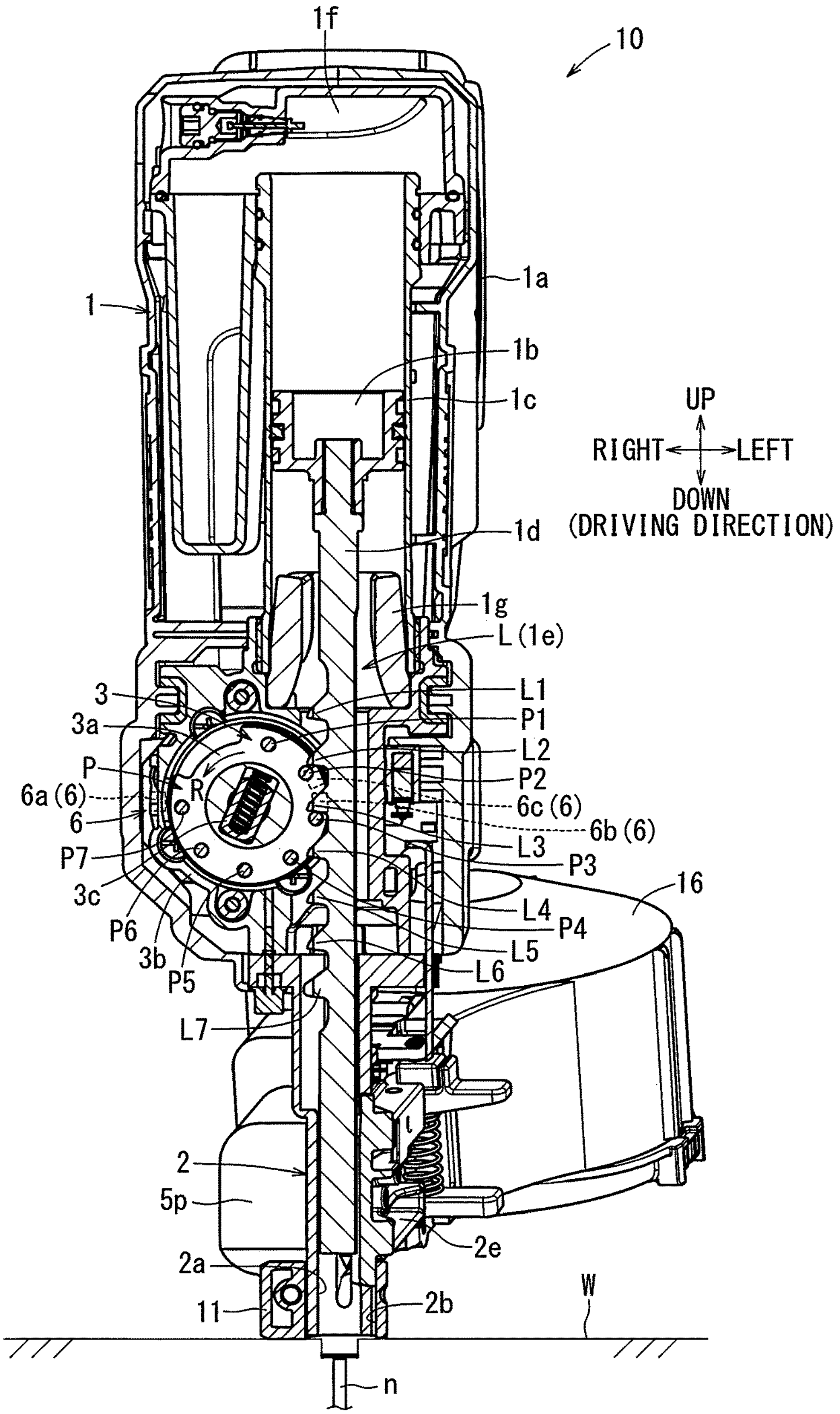
FIG. 10 is a view corresponding to FIG. 4 in a state where the lifter lifts the driver.

As shown in FIG. 9, the rotation of wheel 3*a* causes the seventh engagement pin P7 to move over the seventh engaging portion L7 and disengage from each other. The piston 1*b* then moves downward until it contacts the damper 1*g* due to the gas pressure in the pressure accumulation chamber 1*f*. This causes the driver 1*d* to drive the first driven member n into the workpiece W. As shown in FIG. 10, the wheel 3*a* continues to rotate in the direction indicated by the arrow R. The first engagement pin P1 engages then the first engaging portion L1. As the wheel 3*a* continues to rotate, a second engagement pin P2 engages a second engaging portion L2, and a third engagement pin P3 engages a third engaging portion L3. Hereafter, each engagement pin P is sequentially engaged with each engaging portion L. This causes the driver 1*d* and piston 1*b* to move upward. The engagement state is normal when the number assigned to the reference sign P for the engagement pin P and the number assigned to the reference sign L for the engaging portion L are the same.

Figure 11:
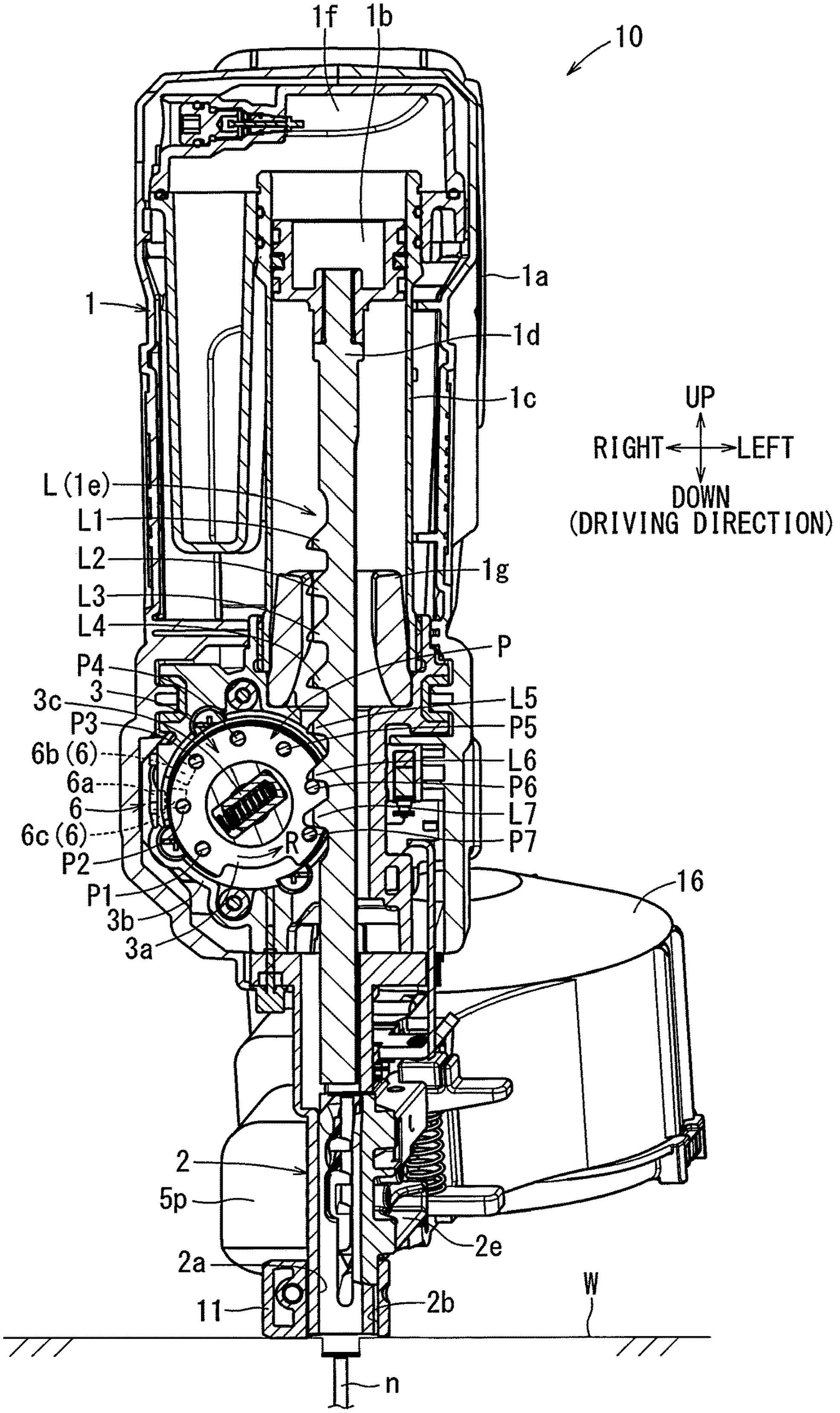
FIG. 11 is a view corresponding to FIG. 4 when a lower end of the driver is above a set position.

As shown in FIG. 11, as the wheel 3*a* continues to rotate, the second magnet 6*c* faces the Hall IC 6*a*. The Hall IC 6*a* detects the magnetism of the second magnet 6*c*. The Hall IC 6*a* then transmits a signal to the controller 19 (see FIG. 2). The controller 19 determines that the lower end of the driver 1*d* is positioned above a set position of the driven member n. The controller 19 then operates the drive unit 4 to reduce the rotation speed of the wheel 3*a*. This suppresses excessive rotation of the wheel 3*a*. The wheel 3*a* may then be prevented from passing by the stand-by position of the driver 1*d*. Furthermore, the controller 19 operates the feed mechanism 5 to feed the driven member n to the set position.

Figure 6:
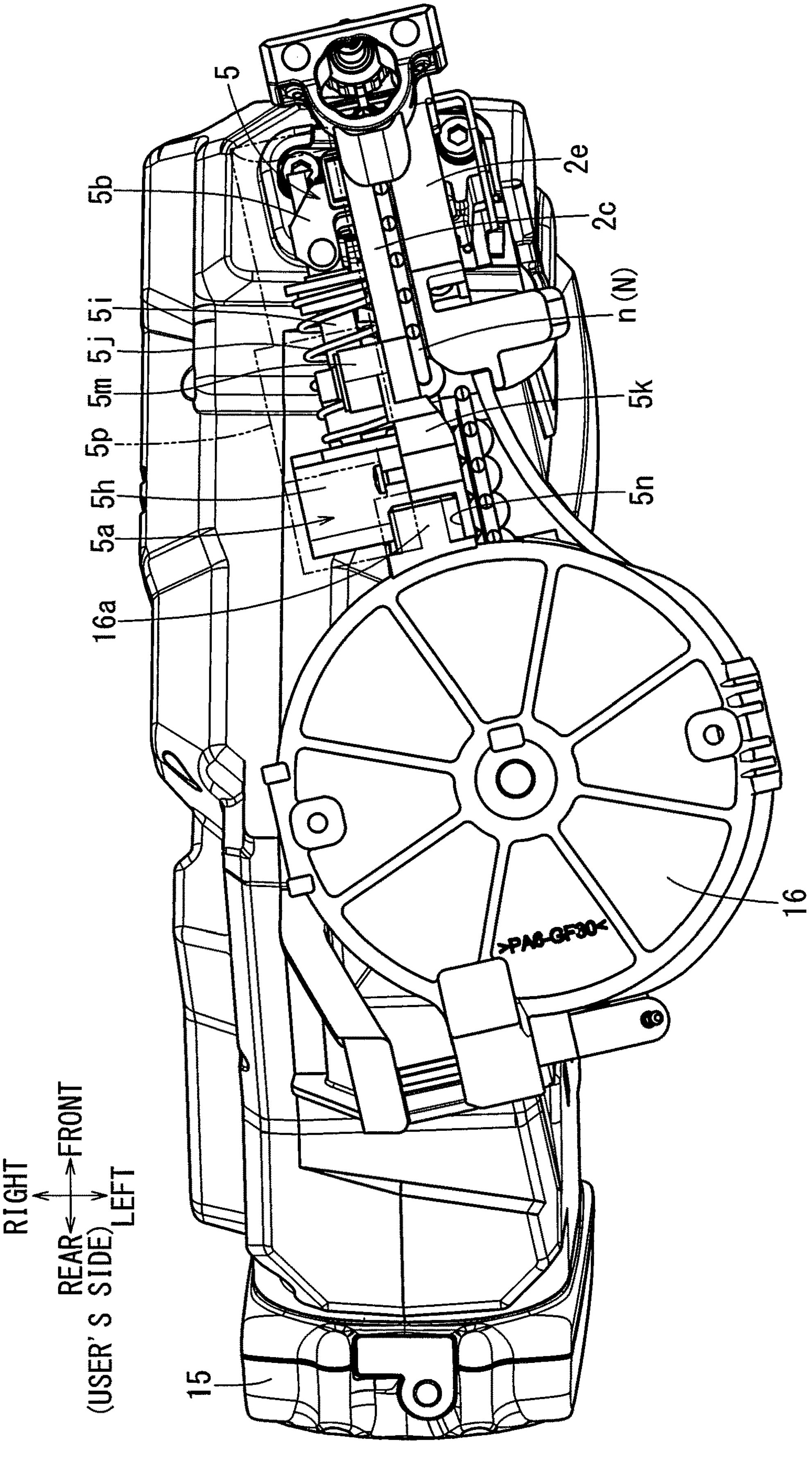
FIG. 6 is a view as viewed from an arrow VI in FIG. 1.

As shown in FIG. 2 and FIG. 6, the feed mechanism 5 is located between the nose portion 2 and the magazine 16. The feed mechanism 5 has a feeder 5*a* that feeds the driven member n to the set position. The feeder 5*a* has a solenoid 5*h* operated by the controller 19. The solenoid 5*h* is installed in a solenoid holder 5*k* made of resin. This prevents for the impact, received by the nose portion 2 when the driver 1*d* is driven, to be transmitted to the solenoid 5*h*. Therefore, the solenoid 5*h* is prevented from being damaged by the impact.

As shown in FIG. 14, the solenoid holder 5*k* has a pair of extensions 5*m* at its front part that extend toward the nose portion 2. A plunger 5*i* that is mounted to the solenoid 5*h* is interleaved between the pair of extensions 5*m*. As shown in FIG. 6, each extension 5*m* contacts with a surface that is parallel to a feeding surface to guide the driven member n in the channel member 2*c*. Each extension 5*m* and channel member 2*c* are connected to each other by a bolt and nut. As a result, the solenoid 5*h* is fixed to nose portion 2 via the solenoid holder 5*k*. Therefore, compared to a configuration where the solenoid 5*h* is fixed to the magazine 16, the solenoid 5*h* can be properly positioned with respect to the nose portion 2. Furthermore, by mounting the solenoid 5*h* to the solenoid holder 5*k*, the feeder 5*a* can be unitized. This makes it easier to mount the feed mechanism 5 to the nose portion 2.

As shown in FIG. 6, the solenoid holder 5*k* has a recess 5*n* at its rear part into which a projection 16*a* of the magazine 16 is removably inserted. When the projection 16*a* is inserted into the recess 5*n*, the solenoid holder 5*k* and the magazine 16 are secured so that they are not significantly shifted from each other. The feed mechanism 5 has a holder cover 5*p* that covers the feeder 5*a* from the outside. The holder cover 5*p* is covered over the solenoid holder 5*k* and the channel member 2*c*. The projection 16*a* of the magazine 16 is supported between the holder cover 5*p* and the recess 5*n* of the solenoid holder 5*k* in a clamped manner.

Figure 12:
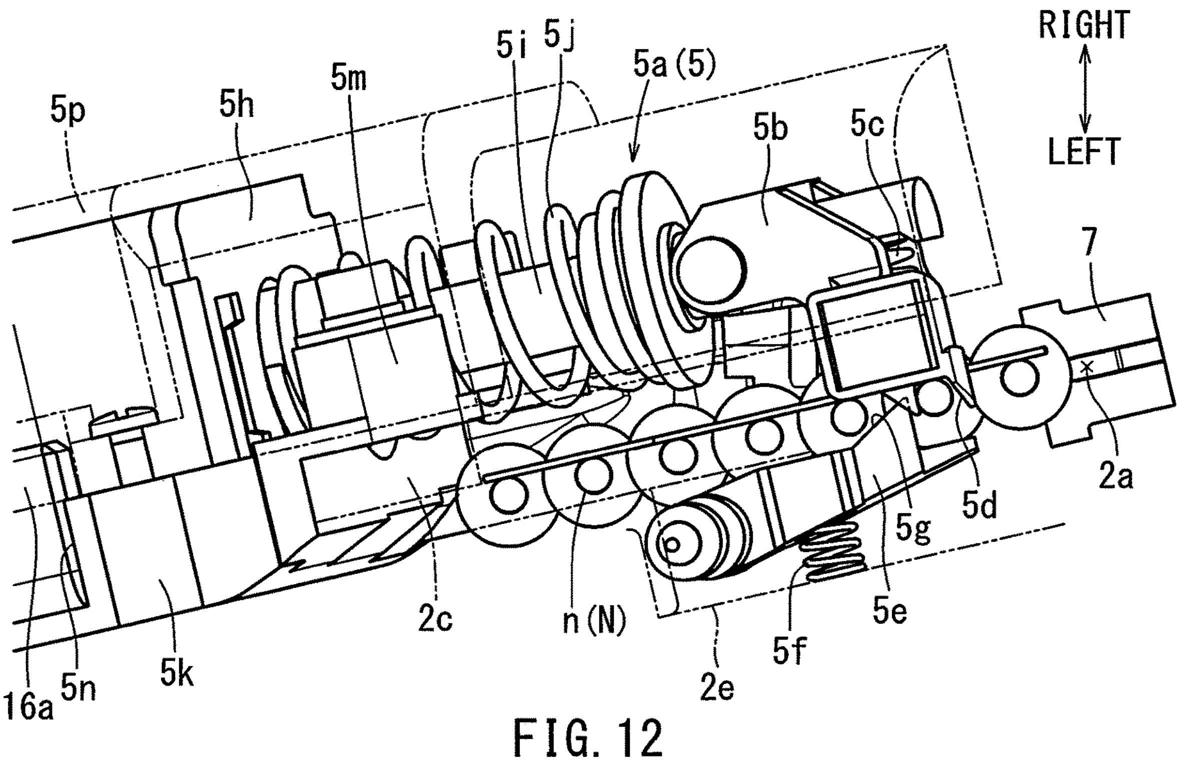
FIG. 12 is a view as viewed from an arrow XII in FIG. 2, including a partial cross-section.

As shown in FIG. 12, the feeder 5*a* has a plunger 5*i* that can move in a feeding direction of driven member n with respect to solenoid 5*h*. A feed pawl 5*b* is rotatably attached to an end of the plunger 5*i*. The feed pawl 5*b* is biased by a spring 5*c* to protrude toward the side of the driven member n. The feed mechanism 5 has a return preventing pawl 5*e* on an opposite side opposite to the feed pawl 5*b* across the driven member n. The return preventing pawl 5*e* is rotatably mounted to the lid member 2*e* of the nose portion 2. The return preventing pawl 5*e* is biased by a spring 5*f* to protrude toward the side of the driven member n.

Figure 13:
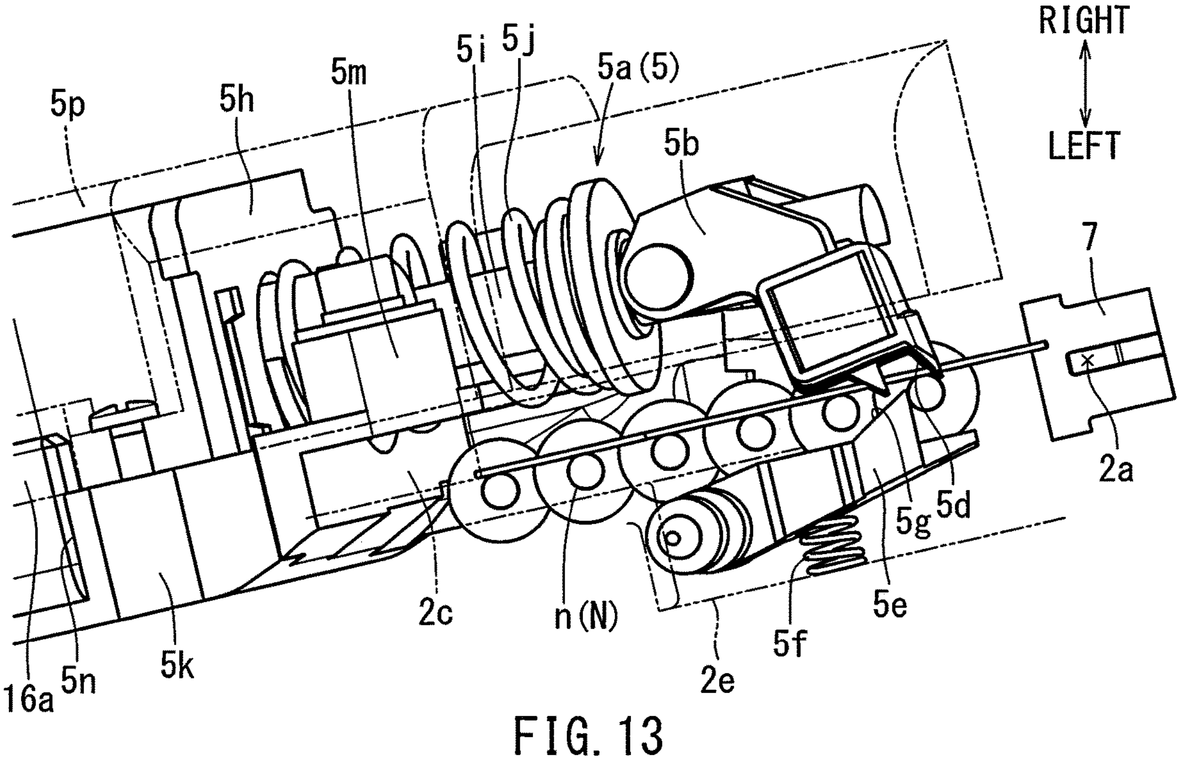
FIG. 13 is a view corresponding to FIG. 2 while a feed jaw in FIG. 2 is being returned in a counter-feeding direction.

As shown in FIG. 12, the plunger 5*i* is biased in the feed direction by the feed spring 5*j*. When the solenoid 5*h* receives the electric power in accordance with the control of controller 19, the plunger 5*i* moves in the counter-feeding direction against the biasing force of the feed spring 5*j*. As shown in FIG. 13, the feed jaw 5*b* also moves in the counter-feeding direction. The feed jaw 5*b* has a feed inclined surface 5*d* that is inclined forward as it extends toward the end that protrudes toward the side of the driven member n. The feed inclined surface 5*d* contacts the driven member n as the feed jaw 5*b* moves in the counter-feeding direction. As a result, the feed jaw 5*b* is retracted in a direction away from the driven member n against the biasing force of the spring 5*c*. The feed jaw 5*b* moves to the rear side over one driven member n. The connecting driven member N is restricted from moving in the counter-feeding direction by the return preventing pawl 5*e*. Therefore, the connecting driven member N is held so as not to follow the return of the feed jaw 5*b*.

When the electric power to the solenoid 5*h* is cut off, the feed jaw 5*b* moves in the feeding direction by the biasing force of the feed spring 5*j*. The feed jaw 5*b* presses the driven member n in the feeding direction. The connecting driven member N is then fed toward the driving channel 2*a*. The first driven member n is set in the set position. As shown in FIG. 12, the return preventing pawl 5*e* has a return preventing inclined surface 5*g* that is inclined forward as it extends toward the end that protrudes to the side of the driven member n. When the connecting driven member N is fed, the driven member n contacts the return preventing inclined surface 5*g* from the rear. As a result, the return preventing pawl 5*e* is retracted in a direction away from the driven member n against the spring 5*f*. The feed pawl 5*b* continues to press the driven member n in the feeding direction by the biasing force of the feed spring 5*j* even after feeding the driven member n in the set position. This prevents the driven member n from returning to the counter-feeding direction after being fed to the set position.

As described-above and shown in FIG. 2, the driving tool 10 has a nose portion 2 in which the driving channel 2*a* is formed. A contact arm 11 is movably provided at the end of the nose portion 2. The contact arm 11 moves between an OFF position protruding from the nose portion 2 and an ON position on the side of the nose portion 2 from the OFF position. The driver 1*d* strikes a driven member n set in the driving channel 2*a*. The shutter 7 moves between the blocked position, which is located on the travel path of the driver 1*d*, and the open position, which is retracted from the travel path and allows the driver 1*d* to move. The connecting rod 8 connects the contact arm 11 and the shutter 7. The connecting rod 8 moves the shutter 7 from the blocked position to the open position in conjunction with the movement of contact arm 11 from the OFF position to the ON position. Furthermore, the connecting rod 8 moves the shutter 7 from the open position to the blocked position in conjunction with the movement of contact arm 11 from the ON position to the OFF position.

Thus, the movement of the contact arm 11 in both directions is coupled to the movement of the shutter 7 in both directions by the connecting rod 8. Therefore, the shutter 7 moves reliably to the open or blocked position in response to the movement of the contact arm 11.

As shown in FIG. 7, the connecting rod 8 has a front part 8*a* that is rotatably connected to the contact arm 11 and a rear part 8*b* that is rotatably connected to the shutter 7. This allows the movement of the contact arm 11 to be smoothly transmitted to the shutter 7 via the connecting rod 8.

As shown in FIG. 8 and FIG. 15, the shutter 7 moves in a direction different from the direction of movement of the contact arm 11 between the ON and OFF positions. Thus, the shutter 7 can be moved in the preferred direction. For example, even if the movement direction of the contact arm 11 is set to the driving direction, which is easy to operate by pressing the contact arm 11 against the workpiece, the shutter 7 can easily move in a direction different from the driving direction to block the driving channel 2*a*.

As shown in FIG. 8 and FIG. 14, the shutter 7 moves in a direction perpendicular to the driving direction of the driver 1*d*. This may reduce an installation space for the shutter 7 in the driving direction. For example, the installation space for the shutter 7 in the driving direction may be reduced compared to the case where the shutter 7 moves in the driving direction. Furthermore, the shutter 7 may have a thickness along the driving direction to ensure the strength of the shutter 7.

As shown in FIG. 7 and FIG. 14, the nose portion 2 has a guide hole 2*d* perpendicular to the driving direction of the driver 1*d*. The shutter 7 is inserted into the guide hole 2*d* and slides along the guide hole 2*d*. Therefore, the shutter 7 can be easily mounted to the nose portion 2 via the guide hole 2*d*. Furthermore, the guide hole 2*d* may allow the shutter 7 to move smoothly.

As shown in FIG. 14 and FIG. 15, the shutter 7 has a wide part 7*b* formed wider than a width of the driver 1*d*. When the driver 1*d* moves in the driving direction and touches the shutter 7, the wide part 7*b* is supported by the downstream receiving surface 2*f* of the guide hole 2*d* in the driving direction. Therefore, the load of the driver 1*d* can be distributed and transmitted to the downstream receiving surface 2*f* of the guide hole 2*d*. As a result, the impact of the driver 1*d* can be supported by the shutter 7 and the downstream receiving surface 2*f* of the guide hole 2*d*.

As shown in FIG. 14, when the driver 1*d* moves in the driving direction and touches the shutter 7, the shutter 7 is supported by the cooperation of the upstream receiving surface 2*g* and downstream receiving surface 2*f* of the guide hole 2*d* in the driving direction. For example, when the shutter 7 is struck by the driver 1*d* and tilted, the shutter 7 is supported between the upstream receiving surface 2*g* and the downstream receiving surface 2*f* in a clamped manner. Therefore, the impact of the driver 1*d* can be supported by the shutter 7 as well as the upstream receiving surface 2*g* and the downstream receiving surface 2*f* of the guide hole 2*d*.

As shown in FIG. 15, the driver 1*d* is located on a width center line of the shutter 7 as viewed from the driving direction of the driver 1*d*. The connecting rod 8 is also positioned on the width center line of the shutter 7. This allows the shutter 7 to support the driver 1*d* without tilting to one side in the width direction when the driver 1*d* touches the shutter 7.

As shown in FIG. 2, the driving tool 10 has a nose portion 2 in which a driving channel 2*a* is formed. A contact arm 11 is movably provided at an end of the nose portion 2. The contact arm 11 moves between an OFF position protruding from the nose portion 2 and an ON position on the side of the nose portion 2 from the OFF position. The driver 1*d* strikes a driven member n set in the driving channel 2*a*. A shutter 7 is movably provided at the nose portion 2 in a direction perpendicular to a driving direction of the driver 1*d*. The shutter 7 moves between a blocked position located on a travel path of the driver 1*d* and an open position retracted from the travel path to allow the driver 1*d* to move. Therefore, the shutter 7 moves in the direction perpendicular to the driving direction, thereby reducing the installation space for the shutter 7 in the driving direction.

As shown in FIG. 2, the driven member n is a nail connected to a coiled connector. Thus, the driven member n can be compactly contained and mounted.

Various modifications may be made to the examples described above. For example, an example of the driving tool 10 as a gas spring type driving tool has been illustrated that uses gas pressure. Instead, a mechanical spring type driving tool that uses spring force may be applied as well.

The solenoid holder 5*k* may be configured to be connected directly to the nose portion 2 without being connected to the channel member 2*c*. The solenoid holder 5*k* may be configured to be connected to the channel member 2*c* in a plane in a direction different from the feeding direction of the driven member n.

The shutter 7 may be configured to move in a rotary motion between the blocked position and the open position. The shutter 7 may be configured to slide in a direction different from the direction perpendicular to the driving direction. The shutter 7 may be configured not to be connected to the contact arm 11 by a connecting member. The shutter 7 has been shown in the example in a configuration in which it is positioned between the driven member n and the driver 1*d*. Instead, the shutter 7 may be configured to be inserted into a recess or through hole formed in the driver 1*d*, to be engaged with a protrusion formed at the driver 1*d*, or to be hooked to the rack 1*e* to restrict the movement of the driver 1*d*.

The position detection sensor 6 may be provided at the driver 1*d* and be configured to detect the position of the driver 1*d*. The position detection sensor 6 may be configured to detect the stand-by position of the driver 1*d*. The position detection sensor 6 may be provided at any position. The controller 19 may be configured to transmit a signal to the feeder 5*a* when it detects the stand-by position of the driver 1*d*. It may also be configured that the Hall IC 6*a* is provided at the wheel 3*a* and magnets 6*b* and 6*c* are provided at the mechanism case 3*b*. The Hall IC 6*a* and the magnets 6*b* and 6*c* may be provided with an engagement pin P. The magnets 6*b* and 6*c* may be configured, for example, to be inserted into a recess in the wheel 3*a*. Only one magnet may be provided. A magnet may be provided to detect the position at which the driver 1*d* moves downward. This may stop the rotation of the lifter 3 when the driver 1*d* moves downward.

The lifter 3 shown in the example has the engagement pin P. Instead, a pinion-shaped projection may be provided. In this case, a pin may be used as the engaging portion L of the driver 1*d*. The number of engagement pins P and engaging portions L may be any number.

An electric driving tool has a cylindrical magazine that is connected to a tool body. A coil nail is accommodated in the magazine. A feeding mechanism feeds coil nails one by one to a metal nose portion where a driving channel is formed. The feed mechanism has a jaw that engages the first coil nail and a solenoid to allow the jaw to reciprocally move. A conventional solenoid was integrally fixed to the magazine. However, the magazine is typically large and easily rattles as it is connected to the tool body in a cantilever manner. This may cause variation in the accuracy of nail feeding operation of the solenoid. Another possible configuration is to fix the solenoid integrally to the metal nose portion. In this case, however, the impact while driving is likely to propagate to the solenoid. It is also possible that an area of the metal nose portion may increase, resulting in a heavier tool body.

Therefore, there is a conventional need for an electric driving tool with a structure that does not reduce the feeding accuracy of the driven member while suppressing the propagation of impact to the solenoid.

As shown in FIG. 2, the driving tool 10 has a magazine 16 that accommodates driven members n connected to a coiled connector. A driving channel 2*a* is formed in the nose portion 2. A feed mechanism 5 feeds driven members n from the magazine 16 to the nose portion 2. The solenoid 5*h* of the feed mechanism 5 is housed in a solenoid holder 5*k* made of resin. The solenoid holder 5*k* is fixed to the nose portion 2.

Therefore, the solenoid 5*h* is fixed to the nose portion 2 via the solenoid holder 5*k*. The position of the solenoid 5*h* with respect to the nose portion 2 is thus properly positioned compared to a structure in which the solenoid 5*h* is attached to the magazine 16. As a result, the solenoid 5*h* is more accurate in feeding the driven member n into the nose portion 2. Furthermore, the solenoid holder 5*k* is made of resin. Therefore, the impact received by the nose portion 2 is hardly transmitted to the solenoid 5*h*. As a result, the solenoid 5*h* is less likely to be damaged by the impact received via the nose portion 2. Furthermore, since the solenoid holder 5*k* is made of resin, the solenoid holder 5*k* is light in weight compared to a one made of metal.

As shown in FIG. 6, the driving tool 10 has a channel member 2*c* that guides the driven member n to be fed from the magazine 16 to the nose portion 2. The channel member 2*c* is formed of a single member with the nose portion 2. Therefore, the driven member n is guided through the identical member, through the channel member 2*c*, and to the nose portion 2. In addition, the channel member 2*c* is made of metal with higher rigidity than that of resin. Therefore, the driven member n may be fed to the nose portion 2 stably.

As shown in FIG. 6, the solenoid holder 5*k* and the channel member 2*c* are in contact with each other in a plane parallel to a feeding surface of the driven member n to be fed from the magazine 16 to the nose portion 2. Then, they are mutually connected at the contacted plane. The feeding surface of the driven member n has a relatively large area. Therefore, the plane parallel to the feeding surface is also relatively wide. Therefore, the solenoid holder 5*k* may be stably connected to the channel member 2*c* using the relatively wide plane.

As shown in FIG. 6, the solenoid holder 5*k* has a pair of extensions 5*m* that extends into the nose portion 2. The extensions 5*m* are connected to the channel member 2*c*. Since the solenoid holder 5*k* is made of resin, it may be easily configured to have a more complicated structure compared to the nose portion 2, which is made of metal. Therefore, the extensions 5*m* may be easily formed on the solenoid holder 5*k* and the solenoid holder 5*k* may be easily connected to the channel member 2*c* via the extensions 5*m*.

As shown in FIG. 2, the solenoid holder 5*k* has a pair of extensions 5*m*. The plunger 5*i* of the solenoid 5*h* is positioned between the pair of extensions 5*m*. The pair of extensions 5*m* are screwed to the channel member 2*c*. As a result, the pair of extensions 5*m* supports the movement of the plunger 5*i* from both sides. Therefore, the pair of extensions 5*m* improves the feeding accuracy of the driven member n.

As shown in FIG. 12, the feed mechanism 5 has a feed jaw 5*b* that is moved by the solenoid 5*h* to push the driven member n into the nose portion 2. A holder cover 5*p* covering the solenoid 5*h* and the feed jaw 5*b* is attached to the solenoid holder 5*k*. Thus, the holder cover 5*p* protects the solenoid 5*h* and the feed jaw 5*b*.

As shown in FIG. 6, the driving tool 10 has a projection 16*a* formed on one of the two components such as the solenoid holder 5*k* and the magazine 16, and a recess 5*n* formed on the other of the two components into which the projection 16*a* is removably inserted. This prevents the magazine 16 from being shifted significantly from each other with respect to the solenoid holder 5*k*. Thus, the driven member n may be stably fed from the magazine 16 to the nose portion 2.

As shown in FIG. 6, the magazine 16 has a projection 16*a* projecting toward the solenoid holder 5*k*. The projection 16*a* is removably inserted between the holder cover 5*p*, which covers the solenoid 5*h*, and the solenoid holder 5*k*. Therefore, the projection 16*a* of the magazine 16 is interleaved between the two components to be supported using the two components such as the solenoid holder 5*k* and the holder cover 5*p*.

As shown in FIG. 2, the driving tool 10 has a driver 1*d* configured to strike a driven member n set in the driving channel 2*a*. A piston 1*b* is connected to the driver 1*d*. The piston 1*b* generates gas pressure in the cylinder 1*c*. Thus, the driver 1*d* may strike the driven member n using the gas pressure.

As shown in FIG. 4, the driving tool 10 has a lifter 3 that engages the driver 1*d* to allow the driver 1*d* to move upward. A position detection sensor 6 detects a position of the driver 1*d* or the lifter 3. The controller 19 operates the solenoid 5*h* when the lower end of the driver 1*d* is positioned on the side of the cylinder 1*c* from the driven member n set in the driving channel 2*a*, based on a signal from the position detection sensor 6. Thus, the driven member n may be fed into the driving channel 2*a* without being interfered with the driver 1*d*.

The solenoid holder 5*k* may be configured to be connected directly to the nose portion 2 without being connected to the channel member 2*c*. The solenoid holder 5*k* may be configured to be connected to the channel member 2*c* in a plane in a direction different from the feeding direction of the driven member n. In the embodiment, a configuration has been described in which the solenoid holder 5*k* is connected to the channel member 2*c* with the extensions 5*m*. Alternatively, the channel member 2*c* can be configured to have an extension that protrudes toward the solenoid holder 5*k* and is connected to the solenoid holder 5*k*.

The various examples described above in detail with reference to the accompanying drawings are intended to be representative of the present disclosure and thus non-limiting embodiments. The detailed description is intended to teach those skilled in the art to make, use and/or practice the various aspects of the present teachings and thus does not intend to limit the scope of the disclosure in any manner. Furthermore, each of the additional features and teachings described above may be applied and/or used separately or with other features and teachings in any combination thereof, to provide improved electric driving tools and/or methods of making and using the same.

What is claimed is:

1. An electric driving tool comprising:
- a nose portion having a driving channel being formed inside the nose portion;
- a contact arm that is movably provided at an end of the nose portion, wherein the contact arm is configured to move between an OFF position protruding from the nose portion and an ON position on the side of the nose portion from the OFF position;
- a driver configured to strike a driven member set in the driving channel;
- a restricting member that is configured to move between a blocked position located on a travel path of the driver and an open position retracted from the travel path to allow the driver to move; and
- a connecting member configured to connect the contact arm and the restricting member, wherein the connecting member is configured to move the restricting member from the blocked position to the open position in response to a movement of the contact arm from the OFF position to the ON position, and to move the restricting member from the open position to the blocked position in response to a movement of the contact arm from the ON position to the OFF position,
- wherein the connecting member has a first end rotatably connected to the contact arm, and a second end rotatably connected to the restricting member.

2. The electric driving tool of claim 1, wherein the restricting member is configured to move in a direction different from a direction of the movement of the contact arm between the ON position and the OFF position.

3. The electric driving tool according to claim 1, wherein the driver is located on a width center line of the restricting member extending in a driving direction, and wherein the connecting member is located on the width center line of the restricting member.

4. The electric driving tool of claim 1 further comprising:
- a magazine configured to accommodate driven members, the nose portion made of metal,
- a feeder having a solenoid, wherein the feeder is configured to load the driven members into the nose portion from the magazine, and
- a solenoid holder configured to house the solenoid, wherein the solenoid holder is made of resin and is fixed to the nose portion.

5. The electric driving tool according to claim 4, further comprising a channel member formed of a single member with the nose portion and configured to guide the driven member loaded into the nose portion from the magazine.

6. The electric driving tool according to claim 5, wherein the solenoid holder and the driving channel member contact each other in a plane parallel to a feeding surface of the driven member being loaded from the magazine to the driving nose portion, and connect each other in a plane in which they are in contact.

7. The electric driving tool according to claim 6, wherein the solenoid holder has an extension configured to extend toward the nose portion and connect to the channel member.

8. The electric driving tool according to claim 6, wherein the solenoid holder has a pair of extensions positioned in between a plunger of the solenoid and attached to the channel member.

9. The electric driving tool according to claim 4 further comprising a feed jaw moved by the solenoid and configured to load the driven member into the nose portion, and a holder cover being attached to the solenoid holder to cover the solenoid and the feed jaw.

10. The electric driving tool according to claim 4 further comprising a projection formed on one of two components such as the solenoid holder and the magazine, and a recess formed on the other of the two components into which the projection is removably inserted.

11. The electric driving tool according to claim 10, wherein the magazine has the projection projecting toward the solenoid holder, and
- wherein the projection is removably inserted between the solenoid holder and a holder cover configured to cover the solenoid.

12. The electric driving tool according to claim 4 further comprising:
- a driver configured to strike the driven member set in the driving channel,
- a piston connected to the drive, and
- a cylinder in which gas pressure is generated by the piston.

13. The electric driving tool according to claim 12 further comprising:
- a lifter configured to engage the driver to move upward,
- a position detection sensor configured to detect a position of the driver or the lifter, and
- a controller configured to operate the solenoid when a lower end of the driver is positioned below the driven member set in the driving channel and based on a signal from the position detection sensor.

14. An electric driving tool comprising:
- a nose portion having a driving channel being formed inside the nose portion;
- a contact arm that is movably provided at an end of the nose portion, wherein the contact arm is configured to move between an OFF position protruding from the nose portion and an ON position on the side of the nose portion from the OFF position;

a driver configured to strike a driven member set in the driving channel;

a restricting member that is configured to move between a blocked position located on a travel path of the driver and an open position retracted from the travel path to allow the driver to move, wherein the restricting member is configured to move in a direction perpendicular to a driving direction of the driver, wherein the nose portion has a guide hole perpendicular to the driving direction of the driver, wherein the restricting member is inserted into the guide hole and is configured to slide along the guide hole, wherein the restricting member has a wide part being formed wider than a width of the driver, and wherein the wide part is supported by a downstream receiving surface of the guide hole in the driving direction when the driver moves in the driving direction and touches the restricting member; and a connecting member configured to connect the contact arm and the restricting member, wherein the connecting member is configured to move the restricting member from the blocked position to the open position in response to a movement of the contact arm from the OFF position to the ON position, and to move the restricting member from the open position to the blocked position in response to a movement of the contact arm from the ON position to the OFF position.

15. The electric driving tool according to claim 14, wherein the restricting member is supported by a cooperation of an upstream receiving surface and the downstream receiving surface of the guide hole in the driving direction when the driver moves in the driving direction and touches the restricting member.

16. An electric driving tool comprising:

a nose portion having a driving channel being formed inside the nose portion;

a contact arm that is movably provided at an end of the nose portion and is configured to move between an OFF position protruding from the nose portion and an ON position on the side of the nose portion from the OFF position;

a driver configured to strike a driven member set in the driving channel, wherein the driven member is a nail is configured to connect to a coiled connector, a guide hole penetrating the nose portion in a direction perpendicular to a driving direction of the driver, and a restricting member configured to slidably insert along the guide hole, wherein the restricting member moves between a blocked position located on a travel path of the driver and an open position retracted from the travel path to move the driver.

* * * * *